United States Patent
Gorywoda et al.

(12)
(10) Patent No.: US 6,455,020 B1
(45) Date of Patent: Sep. 24, 2002

(54) CATALYST ASSEMBLY COMPRISING CATALYST MESHES AND CERAMIC MESHES

(75) Inventors: Marek Gorywoda, Hanau; Jonathan Lund, Kelkheim, both of (DE)

(73) Assignee: W. C. Heraeus GmbH & Co. KG, Hanau (DE)

( * ) Notice: Subject to any disclaimer, the term of this patent is extended or adjusted under 35 U.S.C. 154(b) by 42 days.

(21) Appl. No.: 09/652,755

(22) Filed: Aug. 31, 2000

(30) Foreign Application Priority Data

Sep. 27, 1999 (DE) .......................... 199 46 261

(51) Int. Cl.⁷ .............................. B01J 21/04; C01C 3/02
(52) U.S. Cl. .................... 423/376; 502/527.24
(58) Field of Search ........................ 423/376; 442/18, 442/24, 32; 502/527.24

(56) References Cited

U.S. PATENT DOCUMENTS

| 3,215,495 A | | 11/1965 | Jenks et al. | |
| 3,925,252 A | * | 12/1975 | Yabuta et al. | 423/213.2 |
| 4,570,679 A | * | 2/1986 | Schippl | 138/149 |
| 5,262,145 A | * | 11/1993 | Agrawal et al. | 423/376 |
| 5,401,483 A | | 3/1995 | Ostroff | 423/376 |
| 5,882,618 A | * | 3/1999 | Bhatia et al. | 423/376 |

FOREIGN PATENT DOCUMENTS

DE          1 301 805          8/1969

* cited by examiner

*Primary Examiner*—Wayne A. Langel
(74) *Attorney, Agent, or Firm*—Norris McLaughlin & Marcus

(57) ABSTRACT

The use of ceramic meshes is offered for spacing catalyst meshes apart from one another in the production of HCN, especially by the Andrussov process.

7 Claims, No Drawings

CATALYST ASSEMBLY COMPRISING CATALYST MESHES AND CERAMIC MESHES

The invention relates to a use of ceramic mesh in the production of HCN, especially by the Andrussov process, and the use of used catalyst meshes.

It is generally known that in the course of time in many heterogenic catalyst reactions the metal catalysts used, especially in the form of catalyst meshes, bond together (sweat together), such that there is an increase in the loss of pressure at the meshes and a lowering of the production rate until the reactor eventually becomes clogged.

DE-AS 13 01 805 discloses the use for example of a ceramic support of aluminum oxide with a honeycomb structure as a support for catalyst meshes in the manufacture of HCN. This ceramic support, however, supports a whole pack of catalyst meshes. The ceramic support is characterized in that it consists of an upper, horizontally disposed, honeycomb-like catalyst support and a layer directly adjoining it and having the same structural thickness, and serving as a gas distributing system, having vertical gas passages of uniform diameter, which has on the bottom feet which rest on the floor of the reaction vessel, and parallel ribs on the upper side, the catalyst support being composed of square individual elements and the gas distribution system being composed of square single blocks.

In U.S. Pat. No. 3,215,495 a method for the production of HCN is disclosed, in which a reaction mixture of ammonia, oxygen and a hydrocarbon gas react together in a reactor bed with a platinum metal mesh catalyst, the reaction gas being passed from the mesh catalyst through an insulating layer of refractory particles.

U.S. Pat. No. 5,401,483 shows, among other things, a catalyst system with a plurality of wire meshes which can be spaced apart from one another by metal meshes.

Typically, in the production of HCN by the Andrussov process, catalyst meshes of PtRh10 with a diameter of about 76 $\mu$m are used. Depending on the working conditions (pressure, throughput), 6 to 60 such meshes are installed in a reactor. The period of use amounts to 60 to 360 days. The temperature in the reactor amounts to 1,050° C. to 1,150° C.

The main reason for the replacement of the catalyst meshes is that their catalytic activity gradually diminishes. The activity, expressed as the conversion of $NH_3$ to HCN, reaches a maximum of about 65 to 70%. It decreases in proportion to the time of use of the catalyst meshes.

The catalyst meshes are removed from the reactor after the activity has fallen below a certain level established for reasons of economy (about 60%, for example).

The main reason for the loss of activity is probably the bonding together (sintering) of the catalyst meshes at the high temperature at which they are used. The bonding of the catalyst meshes changes their porosity, resulting in the shortening of the residence time of the reacting gases, an increase of pressure losses, a lowering of the production rate, and an increase in the hazards of carbon precipitation.

Another reason for the loss of activity is that with some of the ratios of $NH_3$, air and $CH_4$, and/or due to the bonding together of the meshes, successive carbon atoms precipitate onto the catalyst meshes. The carbon atoms reduce the catalytic activity of the catalyst meshes, so that finally they have to be removed from the reactor. Experience shows that carbon precipitates almost entirely on the first catalyst meshes (about half of the meshes).

Furthermore, the activation period of new catalyst meshes in the Andrussov process takes a relatively long time. Experience shows that new catalyst meshes do not reach their full catalytic activity until after about 3 to 5 days. The explanation for this is that the surface of the wires in the catalyst meshes must first be reformed before their full activity is reached. The surface of the wires varies under the reaction conditions by developing a facet-like, very fine texture. This texture has a very large surface area and is responsible for the activity of the meshes.

For the above reasons the problem is to at least partially eliminate the above-stated disadvantages by means of novel uses and of a method for the production of HCN.

This problem is solved by the invention by the uses according to claims 1 and 4.

According to the invention, what is claimed is the use of ceramic meshes to space catalyst meshes away from one another in the production of HCN. In the production of HCN by the Andrussov process, due to the ceramic character of the separator meshes and their function as separators, the bonding together of the catalyst meshes is prevented. The characteristic of the catalyst meshes is not affected thereby, their porosity remains largely constant, and no pressure losses occur, so that the production rate can be kept at the same high level, and furthermore, finally, the danger of carbon precipitation on the catalyst meshes is virtually eliminated.

Preventing the bonding together of the catalyst meshes in the Andrussov process also offers the advantage that:

If carbon precipitates on the first meshes, the latter can be separated from the clean meshes and replaced with fresh ones. It has been found advantageously that the ceramic meshes consist mainly of $Al_2O_3$ and $SiO_2$, and additional additives are possible, especially $B_2O_3$ ($SiO_2$ content from 0 to 30 wt.-%, $B_2O_3$ content from 0 to 15 wt.-%).

Such ceramic meshes can be woven or knitted from ceramic threads. The individual threads themselves best consist of bundled, spun or twisted fibers. The individual fibers have a thickness of about 5 to 20 $\mu$m. The threads can have different thicknesses. Diameters of 0.3 to 0.8 mm are advantageous. The meshes themselves are to have a porosity (open area) between 10 and 70%. This porosity is important so that the ceramic meshes will produce virtually no measurable resistance (pressure drop) when the reaction gases pass through them.

Furthermore, the (repeated) use of used-up catalyst meshes as catalyst meshes through which educt streams flow at least substantially first in the production of HCN, when a plurality of catalyst meshes are spaced apart by ceramic meshes and arranged one behind the other, is claimed for the invention. In this manner the number of the freshly used meshes can be reduced, thus saving time and expense. In this connection it is possible to make use of such a used catalyst mesh as a starter mesh, i.e., a mesh through which educt streams first pass when a plurality of successively arranged catalyst meshes are used. After a certain time in the reactor the lower, still clean catalyst meshes will have partially reformed their wire surface. Therefore, after a mesh replacement they can be moved to the front. They need a shorter time for an additional surface reformation, thereby reducing the activation time.

The following example will serve to explain the invention.

The use of the ceramic meshes was tested in an HCN reactor. This HCN reactor is equipped with twelve catalyst meshes. The time of use of the meshes normally amounts to 90 days. The activation period in this reactor is about 4 days. After this time the efficiency of the conversion of $NH_3$ to HCN is about 68%. At the end of the run the efficiency drops to about 60% and the catalyst meshes are taken out.

In the first test, samples of woven ceramic meshes of a size of about 7×7 cm were installed in back of the last catalyst mesh in the HCN reactor. The chemical composition of the ceramic meshes was various. The following compositions (in wt.-%) were tested:

1.) $Al_2O_3$ 62%, $SiO_2$ 24%, $Ba_2O_3$ 14%;
2.) $Al_2O_3$ 70%, $SiO_2$ 28%, $Ba_2O_3$ 2%;
3.) $Al_2O_3$ 855, $SiO_2$ 15%;
4.) $Al_2O_3$ >99%.

The thread (yarn) diameter of the samples was about 0.45 mm in each case. The samples had a porosity of about 50%.

After 90 days in the reactor the samples were removed. All samples withstood use in the reactor without damage.

In the second test two ceramic meshes were installed between the catalyst meshes such that groups of four catalyst meshes each were separated from one another. The ceramic meshes were woven the same as the previous samples in the first test.

It was found that the efficiency of conversion of $NH_3$ to HCN had not decreased to the 60% level until after 115 days. When the catalyst was taken out the groups of catalyst meshes and ceramic meshes could easily be separated.

In the third test, the four "last" catalyst meshes from the second test were moved to the front. Instead of twelve new catalyst meshes, only eight new ones were used. The catalyst meshes were, as in the second test, separated from one another by two ceramic meshes. It was found that the fill conversion efficiency of about 68% was reached after only two days.

What is claimed is:

1. In a process for producing HCN, wherein a mixture of ammonia, oxygen and a hydrocarbon is passed over a plurality of catalyst meshes to form HCN, the improvement which comprises interposing ceramic mesh between at least some of said catalyst meshes to space them apart.

2. Process according to claim 1, wherein said process is the Andrussov process.

3. Process according to claim 1, wherein said ceramic meshes are predominantly of $Al_2O_3$ and $SiO_2$.

4. Process of claim 1, wherein said catalyst meshes are used catalyst meshes and are arranged in tandem and separated from one another by ceramic meshes, and through which educt streams flow in the production of HCN.

5. The process of claim 1, wherein said hydrocarbon is $CH_4$.

6. A catalyst assembly for the reaction of ammonia, oxygen and a hydrocarbon to form HCN, comprising a plurality of catalyst meshes at least some of which are spaced apart from each other by a ceramic mesh disposed between them.

7. The catalyst of claim 6, wherein said hydrocarbon is $CH_4$.

* * * * *